(12) United States Patent
Keller et al.

(10) Patent No.: US 8,534,182 B2
(45) Date of Patent: Sep. 17, 2013

(54) VALVETRAIN OIL CONTROL SYSTEM AND OIL CONTROL VALVE

(71) Applicant: Eaton Corporation, Cleveland, OH (US)

(72) Inventors: Robert D. Keller, Davisburg, MI (US); Gerrit V. Beneker, Lake Orion, MI (US); Robert A. Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/669,501

(22) Filed: Nov. 6, 2012

(65) Prior Publication Data
US 2013/0068182 A1  Mar. 21, 2013

Related U.S. Application Data

(63) Continuation of application No. 12/507,153, filed on Jul. 22, 2009, now Pat. No. 8,327,750.

(60) Provisional application No. 61/082,575, filed on Jul. 22, 2008.

(51) Int. Cl.
*F15B 11/08* (2006.01)
*F15B 13/04* (2006.01)

(52) U.S. Cl.
USPC ......... 91/421; 91/433; 137/487.5; 137/489.5; 123/90.12

(58) Field of Classification Search
USPC .......... 123/90.12, 90.33, 90.1, 188.1–188.17; 91/421, 433; 92/34, 40; 137/487.5, 489.5, 137/572; 251/129.17
See application file for complete search history.

(56) References Cited

U.S. PATENT DOCUMENTS

| | | | |
|---|---|---|---|
| 6,895,351 B2* | 5/2005 | Grumstrup et al. | 702/98 |
| 8,162,002 B2* | 4/2012 | Pavin et al. | 137/613 |
| 2008/0268388 A1* | 10/2008 | Zanella et al. | 431/38 |

* cited by examiner

*Primary Examiner* — Thomas Denion
*Assistant Examiner* — Daniel Bernstein
(74) *Attorney, Agent, or Firm* — GTC Law Group LLP & Affiliates; John A. Monocello, III; Lawrence P. Zale

(57) ABSTRACT

A hydraulic control system includes an oil control valve to control oil flow within a valvetrain. The control valve varies the flow rate to actuate an engine component from a first position to a second position based upon fluid pressure from the control valve. Varying the flow rate through the control valve includes increasing the flow rate through the control valve to increase the pressure to a first level to actuate the engine component to the first position. After the engine component is actuated, the flow rate through the control valve is maintained at a level sufficient to maintain the engine component in the first position. To actuate the engine component to the second position the flow rate through the control valve is then decreased. The fluid flow rate through the control valve is then maintained at a level sufficient to maintain the engine component in the second position.

20 Claims, 2 Drawing Sheets

VALVETRAIN OIL CONTROL SYSTEM AND OIL CONTROL VALVE

CROSS-REFERENCE TO RELATED APPLICATIONS

This application is a continuation of U.S. patent application Ser. No. 12/507,153 filed Jul. 22, 2009 which claims the benefit of U.S. Provisional Application 61/082,575, filed Jul. 22, 2008, which are both hereby incorporated by reference in their entirety.

TECHNICAL FIELD

The present invention relates to an oil control system for a valvetrain, and more specifically, to an arrangement and method for reducing oil consumption by the valve train.

BACKGROUND OF THE INVENTION

A hydraulic control system for an engine supplies oil to various engine components and may also include oil control valves to control oil under pressure that may be used to, for example, switch latch pins in switching lifters, switching rocker arms, and switching lash adjusters in engine valve train systems. Valve actuation systems include, but are not limited to, valve deactivation and variable valve lift systems.

Valve lifters are engine components that transfer cam motion which controls the opening and closing of exhaust and intake valves in an engine. Lash adjusters and rocker arms may also be used to change lift profiles on exhaust and intake valves in an engine. In addition to varying valve lift, variable valve actuation systems may selectively activate or deactivate the engine valve. The engine valves are deactivated or locked out to disable operation of some cylinders in an engine when power demands on an engine are reduced. By deactivating cylinders, fuel efficiency of an engine may be improved.

Engine oil control valves must operate with minimum response times to maximize engine efficiency and increase engine durability. Latch pin switching response times include latch pin activation response times and deactivation response times. In variable valve actuation systems, the limited time window for valve actuation is critical and must be minimized. Additionally, as the flow rate and pressures within the system changes due to temperature and engine speed to actuate the valves, the oil flow rate to all the system components is similarly affected.

SUMMARY OF THE INVENTION

A hydraulic control system is provided for reducing oil consumption of an engine valve-train. The hydraulic control system includes an oil reservoir and an oil pump fluidly connected to the oil reservoir to pump oil from the reservoir to at least one engine component.

An oil control valve is fluidly connected to the oil reservoir and the oil pump includes a housing defining a first chamber, a second chamber and a third chamber. A wall of the housing is located between the first and the second chamber. The wall defines an orifice having an angled edge to form a valve seat. A diaphragm is mounted to the housing and forms a wall between the second chamber and the third chamber. A poppet is mounted on the diaphragm. The poppet extends through the orifice and is moveable relative to the valve seat based upon a change in pressures within the first chamber, the second chamber, and the third chamber. Additionally, a solenoid valve selectively fluidly connects the first chamber to the third chamber.

A method of controlling oil flow within a valve train includes pumping fluid from a fluid reservoir to a control valve and varying the flow rate through the control valve such that fluid enters the control valve at a first pressure and flows from the control valve at a second pressure. The fluid from the control valve is directed to at least one engine component of the valvetrain. The engine component is fluidly actuated from a first position to a second position based upon the second pressure from the control valve.

Varying the flow rate through the control valve includes increasing the flow rate through the control valve to increase the second pressure to a first level which actuates the engine component to the first position. After the engine component is actuated, the flow rate through the control valve is maintained such that the second pressure is at a second level which is less than the first level and sufficient to maintain the engine component in the first position. To actuate the engine component to the second position, the flow rate through the control valve is then decreased to decrease the second pressure to a third level. The fluid flow rate through the control valve is then maintained such that the second pressure is at a fourth level that is less than the second level and sufficient to maintain the at least one engine component in the second position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
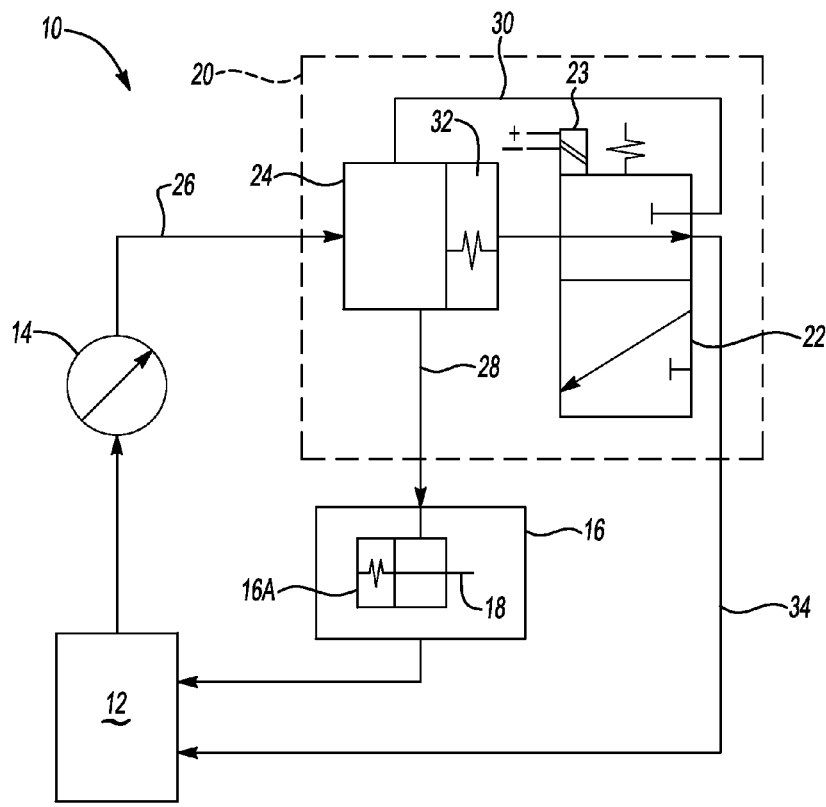
FIG. 1 is a schematic illustration of a hydraulic control system.

Referring to FIG. 1, wherein like reference numbers refer to the same or similar components throughout the several views, a hydraulic control system 10 is illustrated. The hydraulic control system 10 includes an oil reservoir 12 and an oil pump 14. The oil pump 14 pumps oil from the oil reservoir 12 to various engine components 16. The engine components 16 includes at least one engine component 16A which includes a latch pin 18 for actuation of the at least one engine component 16A between an engaged and disengaged position. The at least one engine component 16A could be a lash adjuster, a valve lifter, or a rocker arm. Although the embodiment described below is with reference to one latch pin 18, multiple latch pins 18 may be actuated at one time. The engine components 16 also include other valve-train components such as bearings.

Engagement and disengagement of the latch pin 18 within the at least one engine component 16A is actuated by the hydraulic control system 10 as described below. For example, the at least one engine component 16A is a lash adjuster that changes the lift properties for engine intake and exhaust valves, as is known by those skilled in the art. Oil from the oil pump 14 passes through a oil control valve assembly 20 to the engine components 16 including the at least one engine component 16A before returning to the oil reservoir 12.

The oil control valve assembly 20 includes a solenoid valve 22 and a variable flow valve 24. The oil control valve assembly 20 varies the flow rate from an oil supply gallery 26 to a control gallery 28 to vary pressure within the control gallery 28. The variation in pressure within the control gallery 28 will engage or disengage the latch pin 18. Oil flow from the control gallery 28 also flows to the other engine components 16 prior to returning to the oil reservoir 12.

Figure 2:
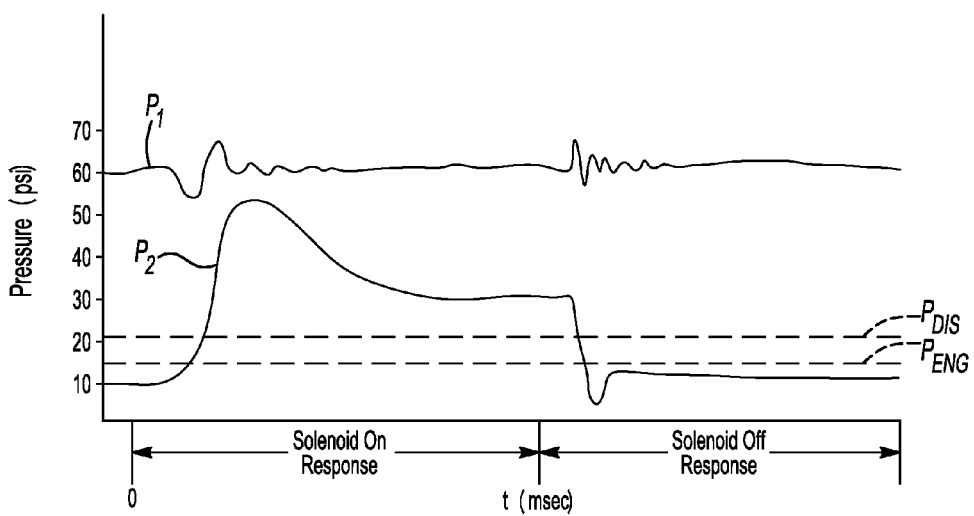
FIG. 2 is plot of pressure within the supply and control galleries versus time for the hydraulic control system in FIG. 1.

Referring to FIGS. 1 and 2, a method of operating the oil control system 10 is explained in further detail. Oil enters the variable flow valve 24 from the supply gallery 26 at a first pressure $P_1$. Oil flow is directed through the variable flow valve 24 to the control gallery 28 which is at a second pressure $P_2$. The second pressure $P_2$ of the control gallery 28 is a sufficient pressure to lubricate the engine components 16. An exemplary maintenance pressure for lubricating and assuring performance of the engine components 16 is 5-12 psi within the control gallery 28. As oil enters the engine components 16 at the $P_2$, the variable flow valve 24 increases or decreases flow in an effort to reach pressure balanced equilibrium within the variable flow valve 24.

The solenoid valve 22 includes an electro-magnetic coil 23. When the electro-magnetic coil 23 for the solenoid valve 22 is energized, a bypass 30 to the solenoid valve 22 is opened. Oil from the supply gallery 26 flows through the solenoid valve 22 to a chamber 32 within the variable flow valve 24. The increased pressure within the chamber 32 significantly biases the pressure balanced equilibrium within the variable flow valve 24 and adjusts the variable flow valve 24 to increase the flow rate from the supply gallery 26, to the control gallery 28. The sudden increase in flow rate into the control gallery 28 causes pressure within the control gallery 28 to increase, which results in sufficient pressure to effect actuation of the latch pin 18. Actuation of the latch pin 18 moves the latch pin 18 from a first position to a second position. In the embodiment shown the latch pin 18 is a normally engaged pin and actuation of the latch pin 18 from the first position to the second position moves the pin from an engaged position to a disengaged position. An example of the latch pin 18 disengagement pressure $P_{DIS}$ for the embodiment shown is 15-20 psi. This is illustrated by the dashed lines of FIG. 2. Due to the sudden increase in flow rate into the control gallery 28 from the supply gallery 26, the control gallery 28 pressure $P_2$ will increase to a first level well past the latch pin 18 disengagement pressure $P_{DIS}$. The rate of the pressure increase within the control gallery 28 is illustrated by the slope of $P_2$ on FIG. 2. The over-rise in pressure decreases the time taken for the control gallery 28 to increase to the disengagement pressure $P_{DIS}$. That is, the rate of pressure increase (the slope of P2) is steeper, reaching the disengagement pressure $P_{DIS}$ sooner and actuating the latch pin 18 more quickly. Thus, the travel time to actuate the latch pin 18 is decreased.

Once the latch pin 18 is disengaged, the increased flow rate from the supply gallery 26 to the control gallery 28 that maintains the higher pressure $P_2$ in the control gallery 28 is not necessary. This higher pressure increases the oil flow through the engine components 16 and back to the reservoir 12, which decreases the engine efficiency. However, the pressure P2 in the control gallery 28 must be maintained above an engagement pressure $P_{DIS}$ for the latch pin 18 such that the normally engaged latch pin 18 is maintained in the second position, which in this embodiment is the disengaged position. As the pressure $P_2$ in the control gallery 28 increases, the variable flow valve 24 re-establishes an equilibrium force between the spring 58 at a reduced load, the pressure in chamber 32 against the diaphragm 52, and the pressure in chamber 24 against the diaphragm 52. Pressure also acts on the poppet 50 from the first chamber 42 and the second chamber 44. The flow rate from the supply gallery 26 to the control gallery 28 settles with the control gallery pressure $P_2$ at a second level. The flow rate is greater than the flow rate when the solenoid valve 22 is off and the bypass 30 is closed. However, the variable flow valve 24 also allows the flow rate to settle such that the pressure $P_2$ in the control gallery 28 at the second level is only slightly above the pressure required to maintain the latch pin 18 in the second position. In the embodiment shown, the control gallery 28 is at a pressure of approximately 30 psi and the pressure to maintain the second position for the latch pin 18 is at 25 psi. The flow rate creating this pressure can be maintained until it is time to move the pin 18 back to the first position, which is the engaged position in this embodiment. The variable flow valve 24 allows the flow rate to the control gallery 28 to settle at a lower flow rate, resulting in the lower pressure in the control gallery 28. Therefore, the oil flow through all the engine components 16 is reduced, reducing oil consumption of the engine components 16 after the latch pin 18 has been moved to the second position and prior to the latch pin 18 being moved back to the first position.

When it is time to reengage the latch pin 18, the magnetic coil 23 for the solenoid valve 22 is de-energized. The solenoid valve 22 switches to an exhaust position. The bypass 30 from the supply gallery 26 to the chamber 32 is closed. However, the chamber 32 is now opened through the solenoid valve 22 to the exhaust gallery 34. Oil within the chamber 32 drains back to the oil reservoir 12. The sudden pressure loss within the chamber 32 causes the force balance within the variable valve 24 to bias the poppet 50 toward the valve seat 46 shutting off the flow to second chamber 44 and control gallery 28. Thus, the pressure within the control gallery 28 drops to a third level. Similar to when the latch pin 18 is disengaged, the pressure change in the in the control gallery 28 is more than what is needed to move the latch pin 18. Thus, the actuation time to re-engage the latch pin 18 is decreased. Additionally, because the variable flow valve 24 previously allowed the pressure $P_2$ within the control gallery 28 to remain only slightly above the disengagement pressure $P_{DIS}$ of the pin 18, the engagement pressure $P_{ENG}$ of the latch pin 18 is reached quickly which also reduces the actuation time.

Once the latch pin 18 is engaged, the variable flow valve 24 re-establishes an equilibrium force between the spring 58 at an increased load, the lower pressure in the third chamber 32 acts against the diaphragm 52, and the pressure $P_2$ in the second chamber 44 also acts against the diaphragm 52. Pressure is also acting on the poppet 50 from the first chamber 42 and the second chamber 44. The flow rate settles at a fourth level that maintains pressure sufficient to maintain engine performance and lubricate the engine components 16. As mentioned above, in the embodiment illustrated in FIG. 2, the flow rate is such that the pressure $P_2$ within the control gallery 28 is approximately 10 psi.

Although the above embodiment is described as having at least one engine component 16A with a normally engaged latch pin 18 that may be disengaged with the oil control valve 20, the at least one engine component 16A may alternately be a normally disengaged pin 18 which is engaged with the oil control valve 20. One skilled in the art would know the proper arrangement for the at least one engine component 16A and latch pin 18 based upon the engine and oil control system 10 for which it is used.

Figure 3:
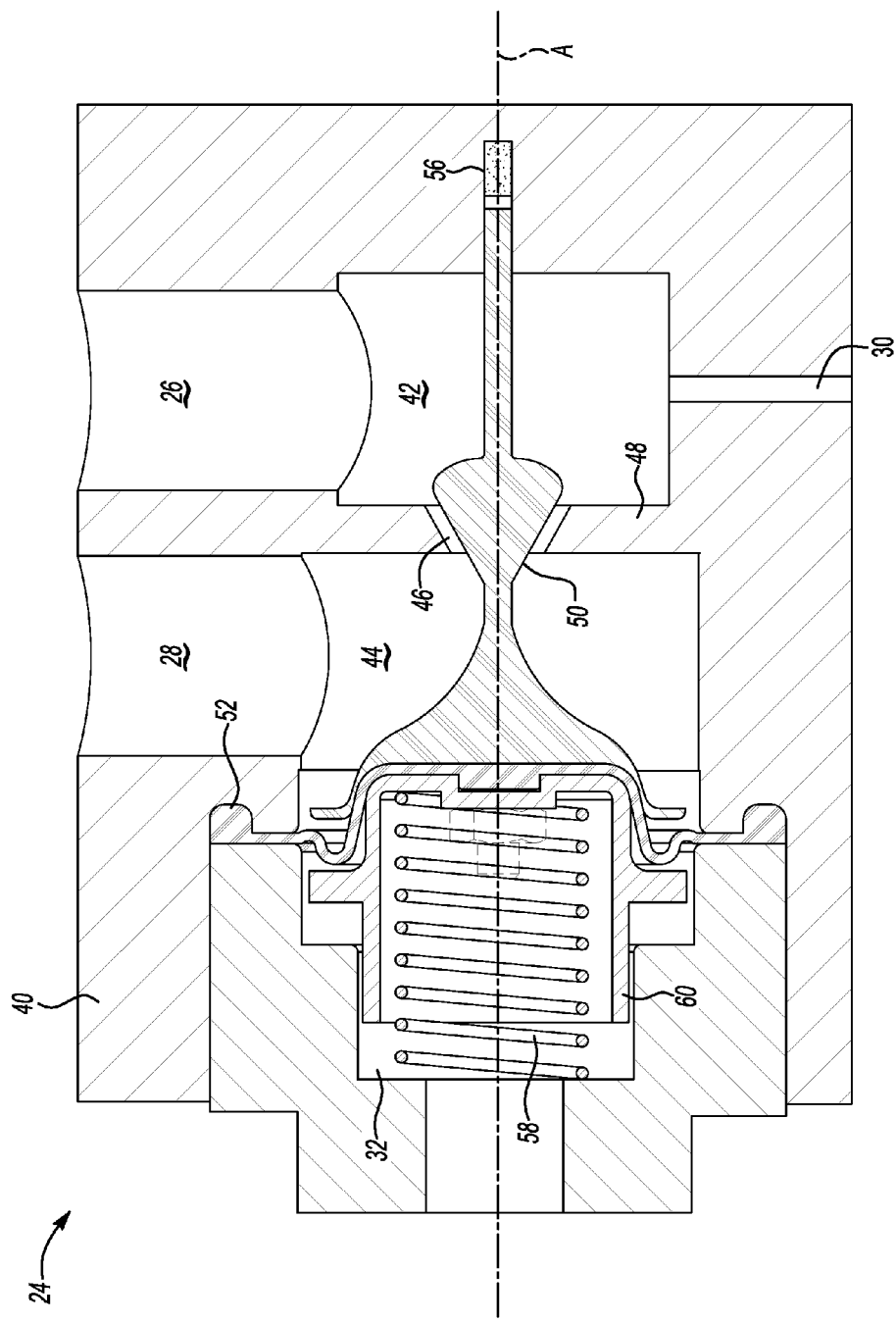
FIG. 3 is a schematic cross-sectional illustration of a variable flow valve for use with the hydraulic control system of FIGS. 1 and 2.

Referring to FIG. 3, an embodiment of a variable flow valve 24 is illustrated. The variable flow valve includes a housing 40 defining a first chamber 42 and a second chamber 44. An orifice 46 is defined by a wall 48 which divides the first chamber 42 from the second chamber 44. Oil enters the first chamber 42 from the supply gallery 26 at a first pressure $P_1$ and flows through the orifice to the second chamber 44 which is at the second pressure $P_2$ and connected to the control gallery 28. In the embodiment shown, the orifice 46 has an angled edge defined by the wall 48 which acts as a seat for a poppet 50. Other arrangements for the orifice 46 to form a valve seat may also be utilized, such as the wall 48, may be flat or otherwise shaped to form the valve seat. One skilled in the art would know the proper arrangement for a valve seat given the variable flow valve 24 application and specifications.

The poppet 50 is mounted to a diaphragm 52. The diaphragm 52 is located between the second chamber 44 and a third chamber 32. The diaphragm 52 seals the second chamber 44 from the third chamber 32 and allows the poppet 50 to move along an axis A. A damper 56 is located at an opposing end of the poppet 50 and dampens oscillations of the poppet 50 that would occur as a result of the changes in the pressure between the first chamber 42, the second chamber 44 and the third chamber 32. In the embodiment shown the damper 56 is illustrated as a fluid damper 56. However, other types of dampers may be utilized as is known to those skilled in the art. A spring 58 is located in the third chamber 32 and biases the poppet 50 to a neutral open position as shown in FIG. 3. The spring 58 acts upon a support 60 which is secured to and protects the diaphragm 52.

As described above, and with reference to FIGS. 1 and 2, fluid from the supply gallery 26 enters the first chamber 42 and flows through the orifice 46 into the second chamber 44, where it then exits the flow control valve 24 to the control gallery 28. When the electro-magnetic coil 23 for the solenoid valve 22 is energized the bypass 30 is opened and fluid also flows from the supply gallery 26, through the first chamber 42, into the bypass 30 and through the solenoid valve 22 to the third chamber 32. The pressure within the third chamber 32 increases and the resulting pressure differential between the second chamber 44 and the third chamber 32 results in unbalancing the force balance equation and creating a biasing force at the diaphragm 52. Therefore, oil flowing into the third chamber 32 forces the diaphragm to flex and moves the poppet 50 axially along the axis A to open the orifice 46 to a greater extent and increase the flow rate from the first chamber 42 to the second chamber 44. Thus, flow from the supply gallery 26 to the control gallery 28 is increased when the solenoid valve 22 is activated. Additionally, because the orifice 46 is larger in diameter than the valve seat (not shown) within the solenoid valve 22 a smaller magnetic coil 23 is sufficient to energize the solenoid valve 22. Thus, reducing the amount of copper required by the magnetic coil 23, the current to the solenoid valve 22, and the amount of oil pressure required to open the solenoid valve 22. Because the size of the orifice 46 allows for increased flow rate of fluid to the control gallery 28 this also increases the rate of latch pin 18 motion and increases the pressure rise (the slope of $P_2$) from $P_{DIS}$ to $P_{ENG}$ on the oil control system 10 over systems having smaller flow rates to the control gallery 28.

After the initial flow of fluid into the third chamber 32, the force applied to the diagram 52 will balance. The variable valve 24 will stabilize at a point that allows increased flow from the first chamber 42 to the second chamber 44 than when the solenoid valve 22 is not energized. The pressure increase in the point of equilibrium is based on the force balance equation. The force balance equation is the force of spring 58 plus the force on the area of the diaphragm 52 multiplied by the pressure within the third chamber 32 minus the force due to the area of the orifice 46 times the control gallery 28 pressure $P_2$, which is equal to the force due to the area of the orifice 46 times the supply gallery 26 pressure $P_1$ plus force on the area of the diaphragm 52 times the control gallery 28 pressure $P_2$. This is represented by the following force balance equation:

$$F(\text{spring } 58) + F((\text{area of diaphragm } 52) * P(\text{chamber } 32)) - F((\text{area of orifice } 46) * P_2) = F((\text{area of orifice } 46) * P_1) + F((\text{area of diaphragm } 52) * P_2)$$

When the solenoid valve is de-energized, the bypass 30 is fluidly disconnected from the third chamber 32. The fluid within the third chamber 32 exits through the exhaust gallery 34 (shown in FIG. 1) to the oil reservoir 12. The flow of oil out of the third chamber 32 decreases the pressure within the third chamber 32 and the fluid pressure $P_2$ within the second chamber 44 to cause the poppet 50 to move axially along the axis A to reduce flow through orifice 46. Due to the extreme delta pressures on both sides of the diaphragm 52 and unbalancing of the force balance equation, the poppet will momentarily close the orifice 46. As the pressure P2 in the second chamber 44 drops, the poppet begins to reopen until the force balance equation come back to equilibrium. The spring 58 prevents the fluid pressure $P_1$ in the first chamber 42 from keeping the orifice 46 closed. Fluid continues to flow from the first chamber 42 to the second chamber 44, although at a reduced rate than before. The poppet 50 is again in the position shown in FIG. 3 which allows fluid to flow into the control gallery 28 at a sufficient rate to maintain the minimal pressure $P_2$ needed to lubricate the engine components 16.

While the best modes for carrying out the invention have been described in detail, those familiar with the art to which this invention relates will recognize various alternative designs and embodiments for practicing the invention within the scope of the appended claims.

The invention claimed is:

1. A hydraulic control system for a valve train comprising:
an oil reservoir;
an oil pump fluidly connected to the oil reservoir;
at least one engine component in fluid communication with the oil pump and the oil reservoir;
an oil control valve in fluid communication with the oil reservoir and the oil pump;
wherein the oil enters the oil control valve prior to the at least one engine component; and
wherein the oil control valve includes:
a housing defining a first chamber, a second chamber and a third chamber;
a wall of the housing located between the first and the second chamber;
wherein the wall defines an orifice to form a valve seat;
a flexible diaphragm mounted to the housing and forming a second wall between the second chamber and the third chamber;
a valve member mounted on the flexible diaphragm and including a poppet, wherein the valve member extends through the orifice and is moveable relative to the valve seat based upon a change in fluid pressures within at least one of the first chamber, the second chamber, and the third chamber;
a solenoid valve to selectively fluidly connect the first chamber to the third chamber; and
wherein the solenoid valve fluidly connects the third chamber to the fluid reservoir when the first chamber is fluidly disconnected from the third chamber.

2. The hydraulic control system of claim 1, wherein the valve member is in a first position relative to the valve seat when the solenoid valve fluidly connects the first chamber to the third chamber and in a second position relative to the valve seat when the solenoid valve fluidly disconnects the first chamber from the third chamber.

3. The hydraulic control system of claim 2, wherein the fluid within the first chamber is at a first pressure and fluid within the second chamber is at a second pressure; wherein the second pressure is lower that the first pressure; and wherein the pressure differential between the first chamber and the second chamber biases the valve member in a first direction toward the valve seat.

4. The hydraulic control system of claim 3, wherein the oil control valve further comprises a spring located within the third chamber to bias the valve member in a second direction away from the valve seat.

5. The hydraulic control system of claim 3, wherein the second pressure is at a first level when the solenoid valve fluidly connects the first chamber to the third chamber and at a second level, lower than the first level, when the solenoid valve fluidly disconnects the first chamber from the third chamber.

6. The hydraulic control system of claim 1, wherein the at least one engine component includes one of a lash adjuster, a valve lifter, and a rocker arm.

7. The hydraulic control system of claim 1, wherein the poppet is configured to fluidly seal against the valve seat.

8. The hydraulic control system of claim 1, wherein the engine component is directly coupled with the second chamber, the oil reservoir is directly coupled with the first chamber, and wherein the oil from the oil reservoir is configured to flow through the first chamber prior to flowing through the second chamber.

9. An oil control valve comprising:
a housing defining a first chamber, a second chamber and a third chamber;
a wall of the housing located between the first and the second chamber, wherein the wall defines an orifice;
a flexible diaphragm mounted to the housing and forming a wall between the second chamber and the third chamber;
a valve member mounted on the flexible diaphragm and including a poppet, wherein the valve member extends through the orifice and is moveable relative to the orifice based upon a change in pressures within at least one of the first chamber, the second chamber, and the third chamber;
a solenoid valve fluidly connected to the first chamber and the third chamber; and
wherein the solenoid valve fluidly connects the third chamber to an exhaust gallery when the first chamber is fluidly disconnected from the third chamber.

10. The oil control valve of claim 9, wherein the second chamber is configured to be fluidly coupled with an engine component.

11. The oil control valve of claim 9, wherein the wall defines an angled edge at the orifice, and wherein the angled edge forms a valve seat for the valve member.

12. The oil control valve of claim 11, wherein the valve member is in a first position relative to the valve seat when the solenoid valve fluidly connects the first chamber to the third chamber and in a second position relative to the valve seat when the solenoid valve fluidly disconnects the first chamber from the third chamber.

13. The oil control valve of claim 11, wherein the poppet is configured to fluidly seal against the valve seat.

14. The oil control valve of claim 11, wherein fluid within the first chamber is at a first pressure and fluid within the second chamber is at a second pressure, wherein the second pressure is lower that the first pressure and the pressure differential between the first chamber and the second chamber biases the valve member in a first direction toward the valve seat.

15. The oil control valve of claim 14, wherein the oil control valve further comprises a spring located within the third chamber to bias the valve member in a second direction away from the valve seat.

16. The oil control valve of claim 14, wherein the second pressure is at a first level when the solenoid valve fluidly connects the first chamber to the third chamber and at a second level, lower than the first level, when the solenoid valve fluidly disconnects the first chamber from the third chamber.

17. The oil control valve of claim 9, wherein the valve member is connected to the housing with a damper.

18. An oil control valve comprising:
a housing defining a first chamber, a second chamber and a third chamber;
a wall of the housing located between the first and the second chamber, wherein the wall defines an orifice having an angled edge, and the angled edge forming a valve seat;
a flexible diaphragm mounted to the housing and forming a wall between the second chamber and the third chamber;
a valve member mounted on the flexible diaphragm and including a poppet configured to fluidly seal against the valve seat, wherein the valve member extends through the orifice and is moveable relative to the orifice based upon a change in pressures within at least one of the first chamber, the second chamber, and the third chamber;
a solenoid valve fluidly connected to the first chamber and the third chamber; and
wherein the solenoid valve fluidly connects the third chamber to an exhaust gallery when the first chamber is fluidly disconnected from the third chamber.

19. The oil control valve of claim 18, wherein the oil control valve further comprises a spring located within the third chamber to bias the valve member in a second direction away from the valve seat.

20. The oil control valve of claim 18, wherein the valve member is connected to the housing with a damper.

* * * * *